United States Patent [19]
Köster

[11] Patent Number: 6,031,861
[45] Date of Patent: Feb. 29, 2000

[54] ELECTRODE AND COOLING ELEMENT FOR A METALLURGICAL VESSEL

[76] Inventor: Volkwin Köster, Rosenstr. 1, 77694 Kehl-Bodersweier, Germany

[21] Appl. No.: 09/117,967

[22] PCT Filed: Feb. 5, 1997

[86] PCT No.: PCT/EP97/00514

§ 371 Date: Aug. 7, 1998

§ 102(e) Date: Aug. 7, 1998

[87] PCT Pub. No.: WO97/29617

PCT Pub. Date: Aug. 14, 1997

[30] Foreign Application Priority Data

Feb. 8, 1996 [DE] Germany ......... 296 02 191 U

[51] Int. Cl.⁷ .................. F27D 1/00; F27D 1/12
[52] U.S. Cl. .................. 373/72; 373/74; 373/76
[58] Field of Search ................ 373/42, 44, 45, 373/52, 71, 72, 75, 76, 94, 108, 93, 74

[56] References Cited

U.S. PATENT DOCUMENTS

| | | |
|---|---|---|
| 4,145,562 | 3/1979 | Stenkvist . |
| 4,204,082 | 5/1980 | Stenkvist . |
| 4,612,650 | 9/1986 | Stenkvist . |
| 4,618,963 | 10/1986 | Rappinger et al. . |
| 4,754,464 | 6/1988 | Feuerstake . |
| 4,947,405 | 8/1990 | Okada ................ 373/72 |
| 5,100,259 | 3/1992 | Buelt et al. . |
| 5,138,629 | 8/1992 | Maki et al. . |
| 5,138,630 | 8/1992 | Suga . |
| 5,479,433 | 12/1995 | Maki et al. . |
| 5,588,018 | 12/1996 | Destannes . |
| 5,590,152 | 12/1996 | Nakajima et al. . |
| 5,673,285 | 9/1997 | Wittle et al. . |

FOREIGN PATENT DOCUMENTS

| | | |
|---|---|---|
| 0 133 652 | 3/1985 | European Pat. Off. ......... 373/72 |
| 26 37 632 | 2/1978 | Germany .................. 373/72 |
| 3835785 | 5/1989 | Germany . |
| 4026897 | 2/1992 | Germany . |
| 4335065 | 4/1995 | Germany . |
| 3-279779 | 12/1991 | Japan . |
| 4-086480 | 3/1992 | Japan . |

OTHER PUBLICATIONS

Takaaki et al, "Furnace Bottom Electrode of DC ARC Furnace", Japanese Abstract 03279779, Dec. 1991.
Nobumoto et al, "Hearth Electrode in DC Electric Furnace", Japanese Abstract 04086480, Mar. 1992.

Primary Examiner—Tu Ba Hoang
Attorney, Agent, or Firm—Medlen & Carroll, LLP

[57] ABSTRACT

The present invention relates to an electrode for a metallurgical vessel and to a cooling element for a wall of a metallurgical vessel. In particular, the present invention provides an electrode and a cooling element having a cavity, a device for cooling by spraying a cooling medium into the cavity, and a collecting device for collecting molten metal that breaks through the cavity. The present invention also relates to a DC arc furnace comprising at least one electrode of the present invention.

31 Claims, 3 Drawing Sheets

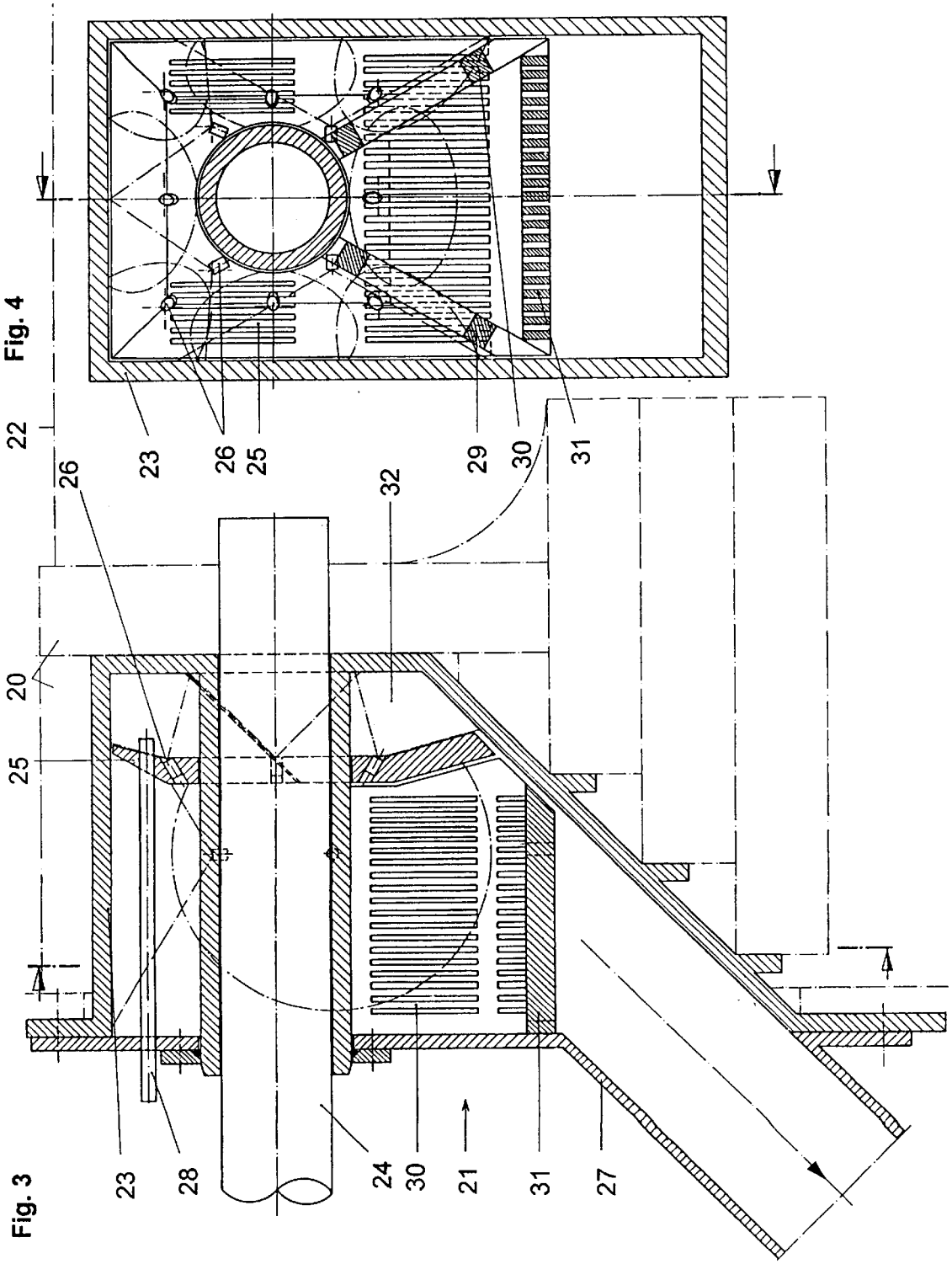

ELECTRODE AND COOLING ELEMENT FOR A METALLURGICAL VESSEL

FIELD OF THE INVENTION

The invention relates to an electrode for a metallurgical vessel and to a cooling element for a wall of a metallurgical vessel. The electrode or cooling element have a cavity and a device for cooling by spraying a cooling medium (liquid or liquid/gas mixture) in this cavity.

The invention furthermore relates to a DC arc furnace which has at least one electrode according to the invention.

BACKGROUND OF THE INVENTION

In metallurgical vessels for electric-furnace steelmaking (e.g., DC arc furnaces) electrodes which are incorporated in the refractory lining of the vessel and which penetrate through this lining (bottom electrodes) serve as anodes for producing the electrical connection to the melt. Those parts of the electrode which are in contact with the molten metal are subject to high thermal wear. For this reason, various cooling devices for bottom electrodes have already been proposed.

By way of example, DE-A-38 35 785 proposes a cooling sleeve which surrounds and cools that part of the electrode which projects out from the vessel wall. The cooling power is low, since only a small region of the electrode is cooled, which region is situated far away from the thermally loaded contact surface between the electrode and the melt. For this reason, the electrode melts relatively quickly and its service life is low. Exchanging electrodes is complicated, since the new electrodes have to be embedded in the refractory material of the furnace wall.

It has therefore already been proposed (DE-B-40 26 897, DE-A-43 35 065) to provide cavities in the electrode body and to cool these cavities by spraying water. For safety reasons, these cavities are situated at a very considerable distance from that part of the electrode which is in contact with the molten metal, and are situated outside the furnace wall. This considerable distance is intended to ensure that in the event of the cooling failing, or in the event of an extraordinary thermal load on the electrode, the latter does not melt to a sufficient extent for molten metal to be able to break through into this cavity. Contact between the molten metal and cooling water can lead to explosive reactions, in particular if water is included in the molten metal, since the formation, eveporation, and expansion of steam tear explosively through the melt. Also, it is impossible to rule out the chemical decomposition of the water followed by detonating gas reactions. Moreover, molten metal breaking through into the cavities could mean that the furnace leaks via the burnt-through electrode and the cavities.

The large distance between cooled cavities and molten metal, which is selected for safety reasons, means that the cooling action is unsatisfactory and, consequently, also means a high electrode wear.

Furthermore, there is a need to cool wall regions of metallurgical vessels (e.g. electric arc furnaces) which are subject to particularly high thermal loads, so as to reduce the wear to the vessel wall. For the same reasons as those cited above, a water cooling system is problematical, as the abovementioned risk of explosion remains. If, under extraordinary operating conditions, molten metal breaks through the vessel wall into such a cooling element, under certain circumstances the vessel can leak via this region which has been burnt through.

SUMMARY OF THE INVENTION

The invention is based on the object of providing an electrode and a cooling element of the type mentioned at the outset, wherein the electrode or the cooling element have a more efficient cooling device and satisfy safety requirements.

This object is achieved according to the invention by the fact that at least one collecting device for collecting molten metal which breaks through into the cavity is arranged in the cooled cavity.

In the context of the invention, the term "spraying" refers to any type of dispersion of the cooling medium in the cavity wherein the dispersion is such that at least part of the internal wall of the cavity is cooled by this medium. Finely dispersed spraying by means of one or more nozzles is preferred. Water or a water/air mixture is preferably used as the cooling medium. The use of other cooling media is also possible. A particularly high cooling action can be achieved by the use of liquid sodium as the coolant.

The term collecting device for molten metal which breaks through refers to any device which prevents, or at least delays, the further penetration of molten metal which has broken through into the cavity towards the outer wall of the metallurgical vessel. If sodium is used as the coolant, the collecting device has to be designed in such a way that it does not impede the return flow of the heated medium, or does so only to an insignificant extent.

The term "wall of a metallurgical vessel" is to be interpreted broadly and comprises any wall, for example the bottom, side walls, cover, etc.

In the electrode or cooling element according to the invention, the cavity can project far into the refractory lining of the vessel wall, and close to the end region facing towards the melt, without any safety risk. If, in the event of extraordinarily unfavourable operating conditions, the electrode should melt to such an extent that molten metal breaks through into the cavity, this metal is stopped by the collecting device(s) and is prevented from leaking out of the furnace through the electrode. The invention has recognized that owing to the relatively small quantity of water used in spray cooling, there is surprisingly no risk of explosion caused by contact between molten metal and the spray mist. The collecting devices are designed in such a way that they only prevent the return flow of cooling medium to an insignificant extent. Thus, in the event of molten metal breaking through, cooling medium which may still be present in the corresponding region of the cavity can quickly flow off or be drawn off. In this way, the molten metal which has been stopped by the collecting devices is prevented from including residual water to an extent which can lead to a risk of explosion.

The cooling element according to the invention can be incorporated (preferably at locations which are particularly subject to thermal loading) in a vessel wall, and can perform its cooling action at a short distance from the vessel wall molten metal contact surface. If, in the event of an operational fault, molten metal breaks through the vessel wall into the cooling element, it is stopped by the collecting devices which are provided according to the invention.

In the event that water or a water/air mixture are used as the cooling medium, the operating conditions are advantageously selected in such a way that the water largely or completely evaporates upon making contact with the inner wall of the cavity which is to be cooled. This has two advantages. Firstly, not only the heat-absorption capacity of the water is used for cooling but also the significantly greater heat of evaporation for the water-steam phase transition is used, so that even relatively small flows of cooling water produce a high cooling action. If, under extraordinary operating conditions, molten metal breaks through into the cavity, the temperature in the cavity will rise shortly before this breakthrough to such an extent that virtually all the water evaporates and the molten metal, after breaking through, comes into contact not with sprayed water but only with steam. This further reduces the risk of explosion. Thus, setting the operating conditions such that even in normal operation, the sprayed water or or most of the sprayed water, evaporate on making contact with the wall of the cavity further increases safety.

The heated water and/or the steam flowing out of the cavity expediently sucked out using a reduced-pressure (e.g., a vacuum pump). It are possible to select the suction power of the pump to be higher than that which is required to remove the spray water. Then, if required, additional air can be introduced through an additional inlet, thus assisting with removal of the cooling medium. It is thus possible to ensure that there is no build-up of water at the collecting devices.

In the electrode according to the invention, the collecting device is expediently designed as a device for narrowing the cross-section of the cavity along the main axis of the electrode. The main axis of the electrode is its longitudinal axis which is directed through the vessel wall. A narrowing of the cross-section of the cavity along this main axis means that the cross-section of the cavity is reduced in the plane perpendicular to this main axis. Such a narrowing of the cross-section stops or decelerates further flow of the molten metal, which is of higher viscosity than the cooling medium. The narrowing of the cross-section is advantageously designed in such a manner that the clear cross-section is divided into a plurality of small cross-sectional areas. By way of example, the collecting device may have slotted or perforated plates. Expediently, passage openings for cooling medium to be removed are present. In the case of a perforated plate, these passage openings are the holes arranged therein (e.g., in the forms of slots). The term "perforated plates" refers to any plate which has openings suitable for cooling medium to pass through (e.g., bores, slots, etc.).

A perforated plate does not prevent the cooling medium which has been introduced into the cavity from flowing back, but does stop any molten metal which may have broken through, on the one hand mechanically by the narrowing in the cross-sectional area, and on the other hand thermally owing to its heat-absorption capacity. The perforated plate is heated by the molten material, in the process cooling the forward front of molten material to such an extent that it either solidifies or at least becomes so viscous that it can no longer penetrate through the openings in the perforated plate. A plurality of collecting devices which are arranged one behind the other may be provided in order to increase the safety. It is advantageous if the collecting devices (e.g., the perforated plates) consist of a material which has a melting point which lies above the temperature of the molten metal. In the case of a metallurgical vessel for molten steel, the collecting devices may, for example, consist of stainless steel plates, and the thickness of the plates may, for example, be 30 mm.

In the case of the electrode, the cavity advantageously has its largest dimension extending parallel to the main axis of the electrode. For example, the electrode is cylindrical, and an end side of the cylinder, which may be designed in the form of a spherical cap, faces towards that end of the electrode which is in contact with the molten metal. The cavity may extend far into the wall of the vessel and the associated refractory lining, and the distance from the end side of the cavity to that end of the electrode which projects into the vessel interior need only be a few centimeters (e.g. 5 to 10 cm). This allows effective cooling.

Expediently, at least one nozzle for spraying cooling medium is arranged in that end region of the cavity which faces towards the interior of the metallurgical vessel. In this way, this end region of the cavity, which is subjected to high thermal loading, is cooled particularly efficiently. In the case of the electrode, the coolant can be supplied to the nozzle by means of a tube which extends through the cavity, essentially in the direction of the main axis of the electrode. In addition to its main function of supplying the cooling medium, this tube may at the same time narrow the cross-section of the cavity, thus forming part of the collecting device.

Expediently, it is designed as a thick-walled metal pipe. Its external diameter may, for example, be approximately 30–70% of the internal diameter of the (cylindrical) cavity. Its thick walls mean that the metal pipe has a high heat-absorption capacity and thus contributes to the rapid cooling and solidification of any molten metal which breaks through.

The collecting devices, or parts thereof (e.g. the perforated plates), can hold the tube in the cavity. If the collecting devices have perforated plates, these are advantageously arranged at an angle, in order to increase the cooling action in that region. For example, the collecting devices are arranged in such a manner that still-liquid cooling medium which runs onto them and does not drop through the openings is guided away towards the wall of the cavity.

The wall of the cavity expediently consists of a material with good thermal conductivity (e.g., copper or copper alloy). By way of example, the cavity may be surrounded by a copper cylinder with a closure in the form of a spherical cap. The spherical-cap-like closure faces towards the interior of the vessel.

This end-side closure of the hollow copper cylinder may be adjoined by a metal body which projects into the interior of the metallurgical vessel. This metal body is advantageously a cast steel hood or a copper hood which is attached (for example by welding, snapping on or pressing on) to the copper cylinder. Copper hood and copper cylinder may also be integrally joined to one another. During operation of the electrode, the molten metal melts the cast steel hood until thermal equilibrium is established. In this way, a so-called steel salamander is formed as the electrode closure and, depending on the thermal loading and the temperature of the melt, may become larger or smaller. By comparison with a cast steel hood, a copper hood has an improved thermal conductivity, so that solidifying steel also forms a steel salamander on the copper hood. When a copper hood is used, the higher thermal conductivity of this material means that it is possible to arrange the spray-cooled cavity at a slightly greater distance from the melt, so that there is a still greater safety distance between melt and water-cooled inner surface of the cavity. A pressure sensor may be arranged in the cavity. In the case where steel breaks through into the cavity, the pressure changes and the water feed can be interrupted immediately.

The electrode or the cooling element according to the invention may have one or more temperature sensors. It is particularly advantageous to arrange in each case one temperature sensor at the inner end wall of the cavity and, adjacent thereto, outside the cavity in the electrode body (the cast steel hood). Differential measurements then allow the temperature of the molten material to be determined. In the case of the cooling element, temperature sensors may, for example, be arranged in or on the wall of the cooling element, which preferably consists of copper or steel.

According to the invention, a blowpipe or a lance may additionally be provided for introducing solids, liquids and/or gases into the interior of the metallurgical vessel. As a result, it is possible, by way of example, to introduce oxygen for oxidizing impurities in the melt or powdered coal, for example for the carburization of steel. The blowpipe is expediently cooled, and advantageously, in the case of the electrode, it runs concentrically inside the feedpipe for cooling medium, so that this cooling medium flows around it.

The applicability of an electrode according to the invention is not limited to the supply of current to a molten metal. It may also be used only for the purpose of cooling the refractory lining of a metallurgical vessel and increasing its service life. To this end, in the same way as when used for supplying current, it is arranged in the refractory lining of this metallurgical vessel. There is no need to change the design of the electrode according to the invention when it is used only for cooling purposes, and it is possible merely to omit the devices for supplying current. The protection provided by the claims is also intended to extend to a device configured in accordance with the invention which is used exclusively for cooling purposes.

The invention furthermore relates to a DC arc furnace which has at least one electrode according to the invention and/or a cooling element according to the invention.

DESCRIPTION OF FIGURES

FIG. 3 shows a longitudinal section through a cooling element according to the invention for the wall of a metallurgical vessel, which cooling element is additionally provided with an underbath nozzle for the metal bath;

FIG. 4 shows a cross-section through this cooling element.

DESCRIPTION OF THE INVENTION

Two exemplary embodiments of the invention are described below with reference to the drawings.

Figure 1:
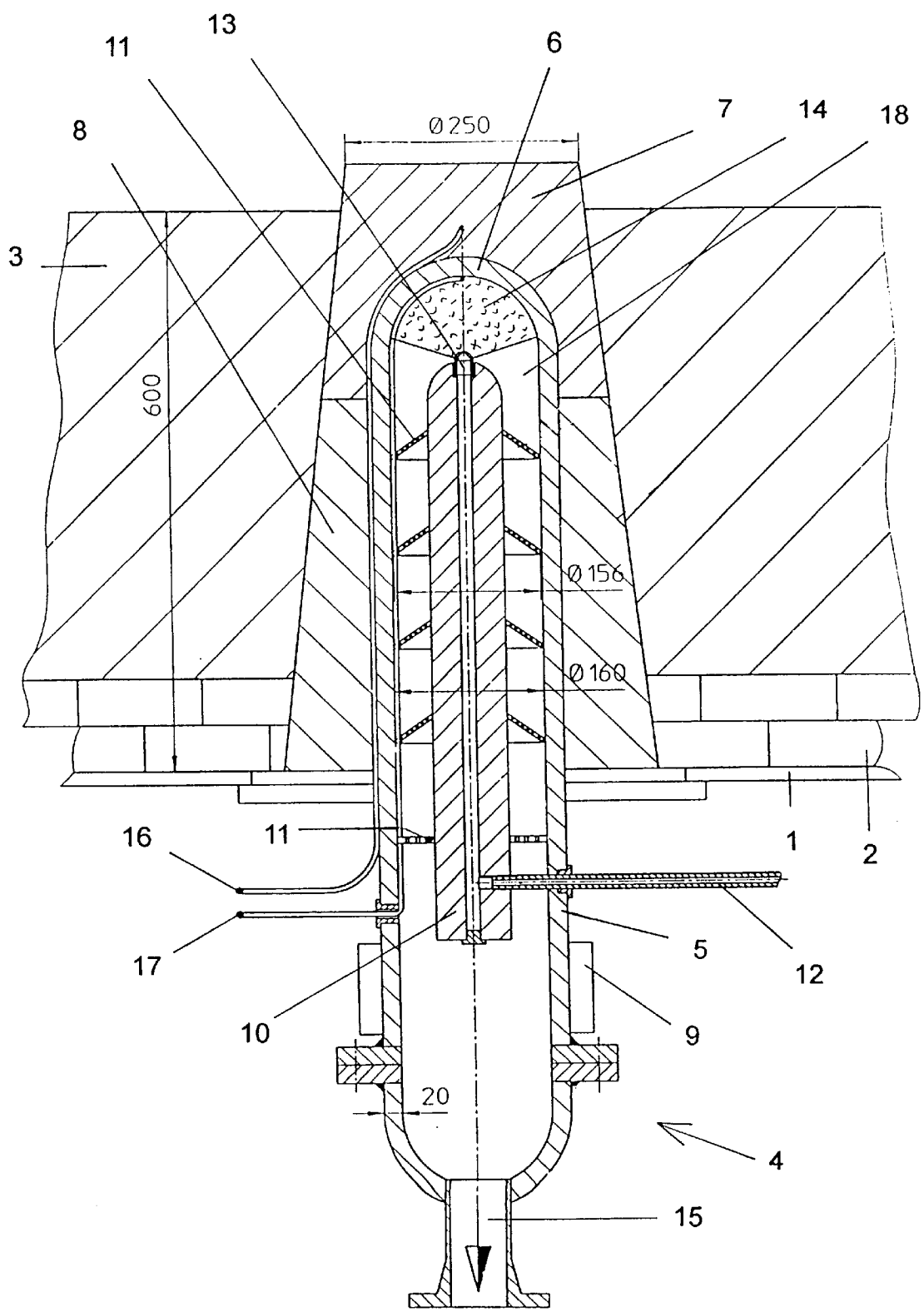
FIG. 1 shows a longitudinal section through an electrode according to the invention.

FIG. 1 shows an electrode according to the invention which is incorporated in the bottom of a DC arc furnace. The furnace wall is of multi-layer design. It has a metallic outer wall 1, a safety course 2 made of refractory material and a further refractory lining 3 ("Ankerhort" refractory ramming compound).

An electrode according to the invention, which is denoted overall by 4, penetrates through this furnace wall. The electrode has a hollow cylinder 5 which is made of copper, extends into the furnace wall and ends at a distance of approximately 50 mm from the inner side of the ramming compound 3, with a spherical-cap-like or hemispherical end-side closure 6. A steel hood 7, which projects into the interior of the furnace, is welded onto the copper cylinder 5 in the region of the end side 6. Beneath the steel hood 7, the copper cylinder 5 is surrounded by a conical or cylindrical casing 8 made of refractory material. The current is supplied to the electrode via a contact clip 9 which surrounds the copper cylinder 5.

A thick-walled steel pipe 10 is arranged concentrically inside the copper cylinder 5, connected to the inner wall of the copper cylinder 5 by means of five annular perforated plates 11 arranged one beneath the other, and held in position by means of these perforated plates 11. This pipe 10 is fed with cooling medium (preferably water or air/water mixture) by means of a feedline 12. At that end which faces the end side 6, the pipe 10 has a nozzle 13, by means of which, as indicated at 14, the cooling medium is sprayed in the form of a cone onto the inner surface of the end-side end 6. At that end which is situated opposite to the end side 6, the copper cylinder 5 has an outlet 15 for removing the heated cooling medium. This outlet 15 may be connected to a reduced-pressure source (e.g., vacuum pump or suction action of a downpipe), in order to assist with drawing off the cooling medium. Connecting the outlet 15 to a reduced-pressure source is useful in particular if the cooling medium, or part thereof, evaporates when it comes into contact with the inner surface of the end-side end 6, and then has to be removed through the outlet 15 not in liquid form but in gas form. Temperature sensors (i.e., thermocouples) 16, 17 measure the temperature in the region of the cast steel hood 7, on the one hand, and at the inner wall of the end side 6 of the copper cylinder 5, on the other hand.

During operation of the furnace and the electrode, cooling medium is supplied to the pipe 10 via the line 12, and is sprayed in the interior of the copper cylinder 5 by means of the nozzle 13. The heated cooling medium runs downwards essentially along the inner wall of the copper cylinder 5, through the perforated plates 11, and is removed through the outlet 15. The molten metal (generally a steel melt) situated in the furnace melts the steel hood until thermal equilibrium is established. The result is a steel salamander which can extend over the ramming compound 3. Owing to the high cooling action caused by spraying cooling medium, and the short distance between the end side 6 and the molten material, the steel hood or steel salamander 7 will not melt completely under normal conditions.

If required, the vacuum pump which is connected to the outlet 15 may have a higher discharge capacity than that which is required to remove the volume of water sprayed in. In this case, the water-feedpipe 10 is expediently concentrically surrounded by a further pipe (not shown in the drawing). In order to balance the pressure, external air can pass into the cavity, which is surrounded by the cylinder 5, through the gap formed between these two pipes and a feedline (likewise not shown in the drawing).

Only in the event of a reduction in or complete failure of the coolant supply can the steel hood 7 melt to such an extent that molten metal comes directly into contact with the end side 6 of the copper cylinder 5. If the copper cylinder 5 then melts and molten metal penetrates into its interior (i.e., the cavity 18), the molten metal comes into contact with the thick-walled pipe 10 and the top perforated plate 11. Owing to the reduction of the cross-section of the interior of the copper cylinder 5, pipe 10 and perforated plate 11 mechanically prevent the molten metal from flowing onwards. Furthermore, owing to their high heat-absorption capacity, they cool the molten material to such an extent that the forward front of molten material either solidifies completely or at least becomes so viscous that it cannot flow onwards through the upper perforated plate 11. If, in exceptional circumstances, the metal should nevertheless break through the first perforated plate 11, there are four further perforated plates for collecting the molten material provided beneath the first plate 11. This ensures that the molten metal cannot under any circumstances penetrate through the copper cylinder 5, and into the region situated outside the furnace wall 1, 2, 3; ;thus, melting the copper cylinder, which has a comparatively low melting point, in the region of the outlet 15, which would then cause the furnace to leak until more or less completely empty. The perforated plates 11 consist, for example, of steel.

Figure 2:
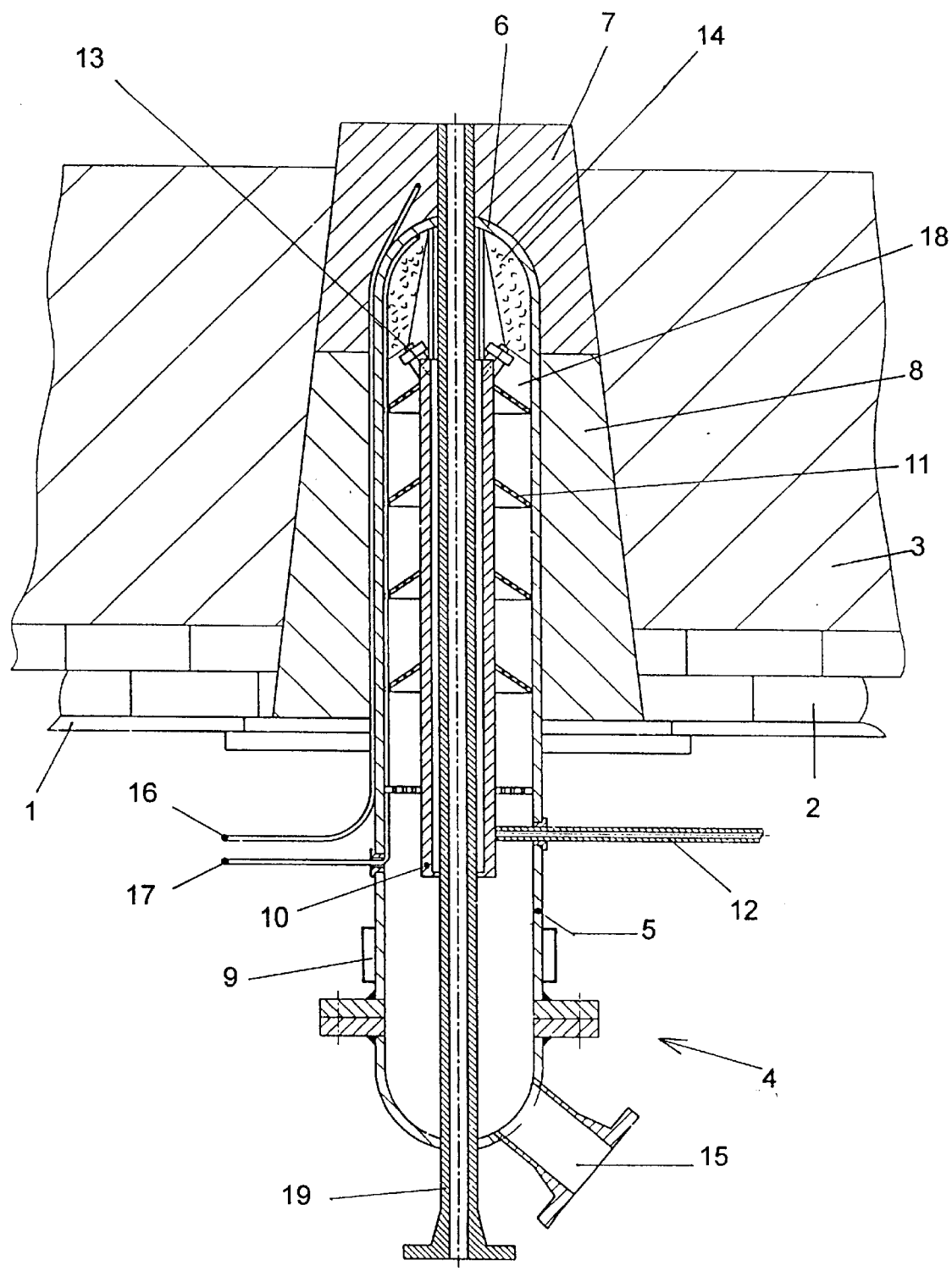
FIG. 2 shows a longitudinal section through a second electrode according to the invention, which additionally has a blowpipe for introducing substances into the interior of the furnace.

FIG. 2 shows an embodiment of the invention in which a blowpipe 19 for introducing solids, gases and/or liquids into the molten metal is present. The blowpipe 19 runs concentrically inside the copper cylinder 5 and the pipe 10, and in its region which runs inside pipe 10 coolant flows around it, so that it is cooled. In this embodiment, two or more nozzles 13, which are distributed over the circumference of the pipe 10, are provided for the purpose of cooling the end-side region 6 of the copper pipe 5.

In the embodiments shown, the perforated plates 11 and the pipe 10 together form the collecting device according to the invention.

In a DC arc furnace, a plurality (e.g. six) of the electrodes according to the invention are generally arranged as anodes in the region of the centre of the furnace bottom, beneath the cathode on the circumference of a circle of, for example, approximately one meter, at equal angular distances.

If an electrode according to the invention is to be used not for supplying current but only as a cooling element for the refractory lining of a furnace, the contact clip 9 is merely omitted and the electrode is not connected to a current source. In this case, only the cooling function of this electrode is utilized, in order to increase the service life of a refractory lining, in particular at locations which are subjected to high thermal loads.

FIGS. 3 and 4 show another embodiment of a cooling element according to the invention for the wall of a metallurgical vessel. Cooling elements, which are denoted by 21, are installed in the wall 20 of a metallurgical vessel (e.g. an electric arc furnace). It is possible for a plurality of these cooling elements 21 to be arranged distributed over the circumference of the furnace, preferably in a region beneath the liquid level 22 of the steel melt. The housing 23 of the cooling elements 21 preferably consists of copper or steel, and is incorporated in the refractory hearth lining through the shell of the bottom part of the furnace. It surrounds the cavity 32. Advantageously, the cooling elements are accessible from the outside, so that maintenance and, if necessary, replacement are possible without major outlay. The embodiment of the cooling element shown has a moveable underbath lance for introducing solid and/or gaseous materials into the molten metal. If a plurality of these cooling elements according to the invention are installed distributed over the circumference of the furnace, as a rule only a few of the elements will have such an underbath lance.

Eight spray nozzles 26 are arranged in a stainless-steel plate 25, which is designed as a collecting device and is explained in more detail below, the spray cones of which nozzles partially overlap one another, so that that region of the cooling-element housing or casing 23 which faces towards the molten metal is essentially covered with cooling medium (preferably water) over its entire surface. Between this front side of the cooling element 21 on which coolant acts and the molten metal, the wall of the metallurgical vessel comprises a refractory plate 20 with a thickness of 100 mm. This refractory plate 20 has a bore allowing the passage of the underbath lance 24.

The cooling medium sprayed in through the nozzles 26 is discharged through an outlet pipe 27 which is connected to a vacuum pump. The suction power of the vacuum pump connected to the outlet pipe 27 is greater than that which is required to suck out the cooling water which has run back. This is intended to prevent a build-up of water at the collecting devices, which are still to be explained. In order to avoid this increased suction power causing significant reduced pressure in the interior of the cooling element 21, an additional pipe 28, through which external air can be sucked in, is provided. The pipe 28 may be provided with a pressure sensor for monitoring the internal pressure in the cooling element 21. The volume of air flowing in through the pipe 28 can be adjusted as required by means of a restrictor (not shown in the drawing).

In order to achieve a high cooling capacity, the cooling element according to the invention is arranged relatively close to the molten metal, i.e. it is separated from the molten metal only by a relatively thin refractory partition 20. If the thickness of the refractory plate 20 is reduced further as a result of wear during operation of the furnace, a solidified layer of steel, in the manner of a steel salamander described above, can form in front of the cooling element. If, under extraordinary operating conditions, molten metal should nevertheless break through into the cooling element 21, the collecting devices outlined below prevent the furnace from leaking.

A first collecting device 25, in the form of a stainless steel slotted plate, is arranged essentially parallel to the front side, which faces towards the molten metal, of the cooling element. A first barrier against leaking melt is formed. The thickness of the stainless steel slotted plate 25 is 30 mm. Slotted plates 29, 30 which run essentially perpendicular to the slotted plate 25 and the arrangement of which can be seen in particular from FIG. 4 are provided as a second collecting device. A further stainless steel slotted plate 31 is arranged in front of the outlet pipe 27 as a third barrier.

Although the stainless steel slotted plates, as collecting devices, allow the cooling water running back to pass through them, they form a barrier to the molten metal which penetrates into the cooling element. The forward front of the molten metal cools and solidifies immediately on coming into contact with the stainless steel plates. The high melting point of the stainless steel used for the collecting devices provides additional protection against molten metal breaking through.

The pressure in the interior 32 of the cooling element can be monitored by means of the pressure sensor, which is connected to the pipe 28. In the event of steel breaking through, the internal pressure will change suddenly. The pressure sensor can then suppress the supply of water to the spray nozzles 26 immediately, thus preventing spray water from passing into the metallurgical vessel.

What is claimed is:

1. An electrode for a metallurgical vessel, comprising at least one cavity, at least one device for cooling by spraying a cooling medium in said at least one cavity, and at least one collecting device disposed within said at least one cavity for collecting molten metal breaking through said at least one cavity.

2. The electrode according to claim 1, wherein said at least one collecting device comprises a device for narrowing the cross-section of said at least one cavity along the main axis of said electrode.

3. The electrode according to claim 2, wherein said at least one collecting device comprises a passage opening for removing said cooling medium.

4. The electrode according to claim 3, wherein said at least one collecting device comprises at least one perforated plate.

5. The electrode according to claim 1, wherein the largest dimension of said at least one cavity extends parallel to the main axis of said electrode.

6. The electrode according to claim 1, wherein said at least one device for cooling comprises at least one nozzle disposed within the end region of said at least one cavity facing the interior of said metallurgical vessel, for spraying said cooling medium.

7. The electrode according to claim 6, wherein said at least one nozzle comprises a tube extending through said at least one cavity in the direction of the main axis of the electrode, for feeding said cooling medium.

8. The electrode according to claim 7, wherein said tube comprises a thick-walled metal pipe.

9. The electrode according to claim 7, wherein said tube is held within said at least one cavity by said at least one collecting device.

10. The electrode according to claim 1, wherein said at least one cavity comprises a wall comprising a material with good thermal conductivity.

11. The electrode according to claim 10, wherein said material is selected from the group consisting of copper and copper alloy.

12. The electrode according to claim 1, further comprising a metal body disposed within the end region of said at least one cavity, wherein said metal body projects into the interior of said metallurgical vessel.

13. The electrode according to claim 12, wherein said metal body is a cast steel hood.

14. The electrode according to claim 1, further comprising at least one temperature sensor.

15. The electrode according to claim 1, further comprising a blowpipe for introducing a group selected from the group consisting of solid, liquid, gas, and a combination thereof, into said interior of said metallurgical vessel.

16. The electrode according to claim 15, wherein said blowpipe comprises a cooling device.

17. The electrode according to claim 1, wherein said cooling medium comprises a group selected from the group consisting of water and a mixture of water and gas.

18. The electrode according to claim 1, wherein said cooling medium comprises sodium.

19. A DC arc furnace, comprising at least one bottom electrode according to claim 1.

20. A cooling element for a wall of a metallurgical vessel, comprising at least one cavity, at least one device for cooling by spraying a cooling medium in said at least one cavity, and at least one collecting device disposed within said at least one cavity for collecting molten metal breaking through said at least one cavity.

21. The cooling element according to claim 20, wherein said at least one collecting device comprises a passage opening for removing said cooling medium.

22. The cooling element according to claim 20, wherein said at least one collecting device comprises at least one plate selected from the group consisting of a perforated plate and a slotted plate.

23. The cooling element according to claim 20, further comprising at least one nozzle disposed within the region of said at least one cavity facing the interior of said metallurgical vessel, for spraying said cooling medium.

24. The cooling element according to claim 20, wherein the wall of said at least one cavity comprises a material with good thermal conductivity.

25. The cooling element according to claim 24, wherein said material is selected from the group consisting of copper and copper alloy.

26. The cooling element according to claim 20, further comprising a metal body disposed within the end region of said at least one cavity, wherein said metal body projects into the interior of said metallurgical vessel.

27. The cooling element according to claim 26, wherein said metal body is a cast steel hood.

28. The cooling element according to claim 26, further comprising at least one temperature sensor.

29. The cooling element according to claim 26, further comprising a blowpipe for introducing a group selected from the group consisting of solid, liquid, gas, and a combination thereof, into said interior of said metallurgical vessel.

30. The cooling element of claim 20, wherein said cooling medium comprises a group selected from the group consisting of water and a mixture of water and gas.

31. The element of claim 20, wherein said cooling medium comprises sodium.

* * * * *